US008234121B1

(12) United States Patent
Swearingen

(10) Patent No.: US 8,234,121 B1
(45) Date of Patent: Jul. 31, 2012

(54) VOICE RECOGNITION SYSTEM FOR AN AVIONICS SYSTEM USING UNIQUE WORDS TO ENCODE SPECIFIC FREQUENCIES

(75) Inventor: Paul A. Swearingen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1186 days.

(21) Appl. No.: 11/891,434

(22) Filed: Aug. 10, 2007

(51) Int. Cl.
*G10L 21/00* (2006.01)

(52) U.S. Cl. ......................... 704/275; 704/270

(58) Field of Classification Search .................. 704/275, 704/270, 270.1, 271–274
See application file for complete search history.

(56) References Cited

U.S. PATENT DOCUMENTS

| | | | |
|---|---|---|---|
| 4,725,956 A | 2/1988 | Jenkins | |
| 5,926,790 A | 7/1999 | Wright | |
| 6,044,322 A * | 3/2000 | Stieler | 701/120 |
| 6,125,341 A | 9/2000 | Raud | |
| 6,128,594 A * | 10/2000 | Gulli et al. | 704/244 |
| 6,173,192 B1 * | 1/2001 | Clark | 455/563 |
| 6,285,926 B1 * | 9/2001 | Weiler et al. | 701/4 |
| 6,512,527 B1 * | 1/2003 | Barber et al. | 715/764 |
| 6,529,706 B1 * | 3/2003 | Mitchell | 455/12.1 |
| 6,567,395 B1 * | 5/2003 | Miller | 370/347 |
| 6,704,553 B1 * | 3/2004 | Eubanks | 455/186.1 |
| 6,720,890 B1 * | 4/2004 | Ezroni et al. | 340/945 |
| 6,745,165 B2 | 6/2004 | Lewis | |
| 6,832,152 B1 | 12/2004 | Bull | |
| 7,010,490 B2 | 3/2006 | Brocious | |
| 7,606,327 B2 * | 10/2009 | Walker et al. | 375/316 |
| 7,606,715 B1 * | 10/2009 | Krenz | 704/275 |
| 2005/0192810 A1 * | 9/2005 | Konig | 704/275 |
| 2007/0288128 A1 * | 12/2007 | Komer et al. | 701/3 |
| 2008/0039988 A1 * | 2/2008 | Estabrook et al. | 701/14 |

OTHER PUBLICATIONS

Pearson, "Voice activated cockpit", Published online by Adacel company, Jan. 3, 2006.*

* cited by examiner

*Primary Examiner* — Jialong He

(74) *Attorney, Agent, or Firm* — Donna P. Suchy; Daniel M. Barbieri

(57) ABSTRACT

An avionics system, including a means to tune communication radio frequencies utilizing a voice recognition system. A specific feature of this mode of initiation is the automatic radio tuning of communication VHF radios by the utterance of specific key words resulting in the automatic transference of letters to numbers.

12 Claims, 1 Drawing Sheet

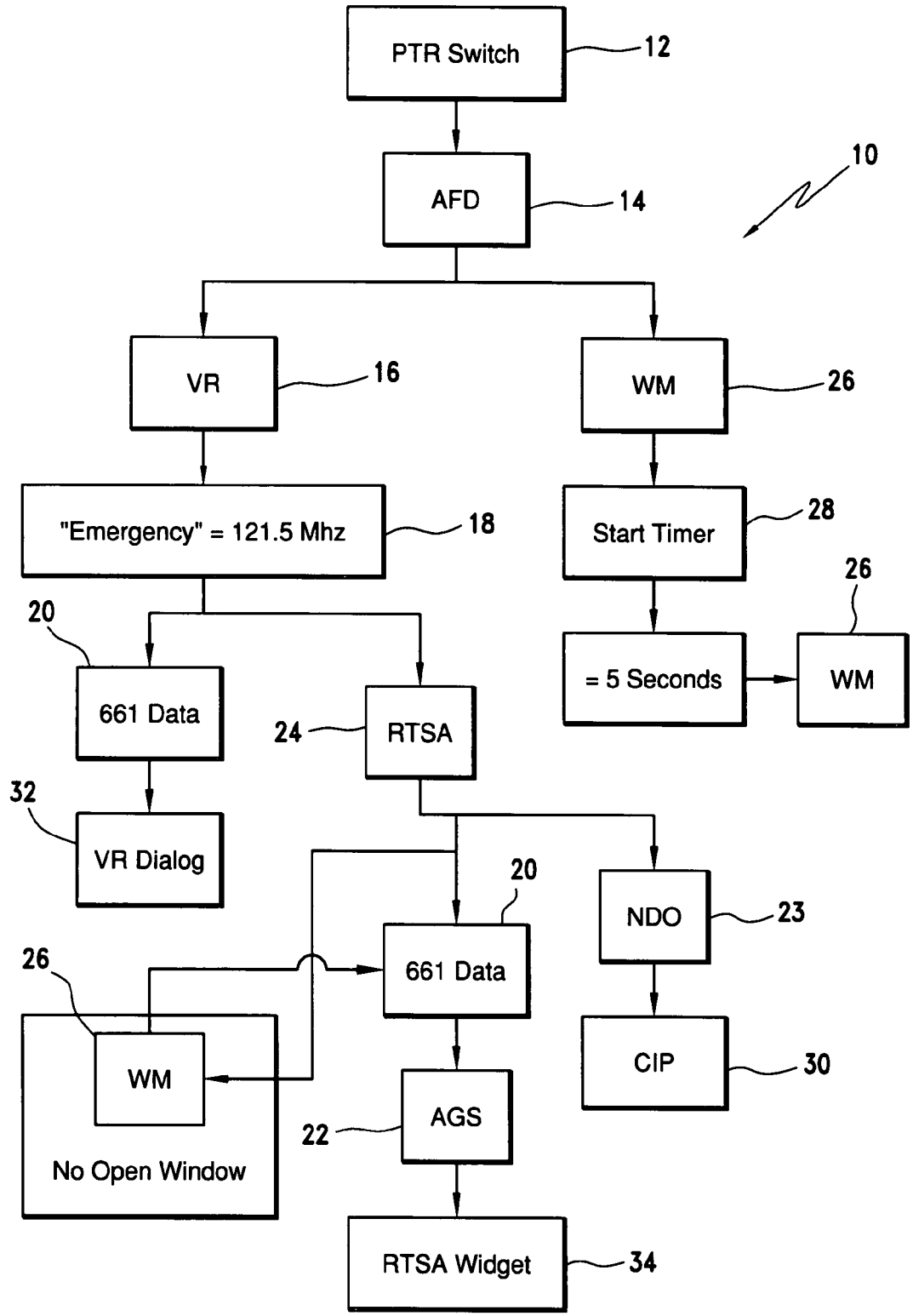

VOICE RECOGNITION SYSTEM FOR AN AVIONICS SYSTEM USING UNIQUE WORDS TO ENCODE SPECIFIC FREQUENCIES

BACKGROUND OF THE INVENTION

1. Field of the Invention

The present invention relates generally to avionics systems, and more particularly to the application specifics of radio tuning utilizing a voice recognition system.

2. Description of the Related Art

Voice Recognition algorithms rely upon grammar and semantics to determine the best possible text match(es) to the uttered phrase(s). The aircraft operating environment is very unique in the grammar rules that are followed, and the grammar suite is rather extensive including "words" that represent unusual collections of characters (e.g. intersection or fix names). These factors make it difficult to develop a comprehensive grammar set for use on an aircraft, and this represents one of several significant challenges to bringing Voice Recognition to the cockpit.

Others have attempted to use dynamic grammar for enhancing voice recognition systems. For example, U.S. Pat. No. 6,125,341, entitled "Speech Recognition System and Method," issued to H. F. Raud et al, discloses a speech recognition system having multiple recognition vocabularies, and a method of selecting an optimal working vocabulary used by the system. Each vocabulary is particularly suited for recognizing speech in a particular language, or with a particular accent or dialect. The system prompts a speaker for an initial spoken response; receives the initial spoken response; and, compares the response to each of a set of possible responses in an initial speech recognition vocabulary to determine a response best matched in the initial vocabulary. A working speech recognition vocabulary is selected from a plurality of speech recognition vocabularies, based on the best matched response.

U.S. Pat. No. 6,745,165, entitled "Method and Apparatus For Recognizing From Here To Here Voice Command Structures in a Finite Grammar Speech Recognition System," issued to J. R. Lewis et al, discloses a method and system that uses a finite state command grammar coordinated with application scripting to recognize voice command structures for performing an event from an initial location to a new location. The method involves a series of steps, including: recognizing an enabling voice command specifying the event to be performed from the initial location; determining a functional expression for the enabling voice command defined by one or more actions and objects; storing the action and object in a memory location; receiving input specifying the new location; recognizing an activating voice command for performing the event up to the new location; retrieving the stored action and object from the memory location; and performing the event from the initial location to the new location according to the retrieved action and object. Preferably, the enabling-activating command is phrased as "from here . . . to here". The user specifies the new location with voice commands issued subsequent to the enabling command. To reduce the occurrence of unintended events, these voice commands are counted so that if they exceed a predetermined limit, the action and object content is cleared from memory.

U.S. Pat. No. 7,010,490, entitled "Method, System, and Apparatus for Limiting Available Selections in a Speech Recognition System," issued to L. A. Brocious et al, discloses a method and system for completing user input in a speech recognition system. The method can include a series of steps which can include receiving a user input. The user input can specify an attribute of a selection. The method can include comparing the user input with a set of selections in the speech recognition system. Also, the method can include limiting the set of selections to an available set of selections which can correspond to the received user input. The step of matching a received user spoken utterance with the selection in the available set of selections also can be included.

Generally, any variation in the grammar implemented in a voice recognition system is based upon previous commands or states computed within the voice recognition system. Such types of systems would have limited applicability in an avionics environment because the grammar in avionics systems is very detached and fragmented.

Current voice recognition parameters call for voice tuning of frequencies by means of speaking numbers to be placed within its STBY (standby) window which equate to the intended frequency. A COMM emergency frequency would require the crew to speak the numbers 1 2 1 5.

SUMMARY OF THE INVENTION

In a broad aspect, the present invention is an avionics system, including a means to tune communication radio frequencies utilizing a voice recognition system. A specific feature of this mode of initiation is the automatic radio tuning of communication VHF radios by the utterance of specific key words resulting in the automatic transference of letters to numbers. For example, in the most relevant case the word EMERGENCY is equated to 121.5 mHZ.

The voice recognition system preferably includes a Push-To-Recognize (PTR) switch for interacting with an Informational Management System (IMS) of the avionics system to signal automatic speech recognition software to begin processing voice commands. An Adaptive Flight Display (AFD) is operatively connected to the PTR switch for accepting commands from the PTR switch and displaying the results of radio tuning commands. A voice recognition (VR) subsystem is operatively connected to the AFD comprising automatic speech recognition software for processing the digital signal received from the IMS via the AFD, the VR subsystem for sending out ARINC data labels to an ARINC Graphics Server (AGS), and Network Data Objects (NDOs) to a Radio Tuning System Application (RTSA). A Window Manager (WM) is operatively connected to the AFD for managing the placement of displays. A Radio Tuning System Application (RTSA) is operatively connected to the VR subsystem for rendering and processing the radio tuning commands displayed by the WM. An ARINC Graphics Server (AGS) renders the displays based on the ARINC data labels.

BRIEF DESCRIPTION OF THE DRAWINGS

FIG. 1 is a block diagram of the avionics system of the present invention.

DETAILED DESCRIPTION OF THE INVENTION

Referring now to the drawings and the characters of reference marked thereon, FIG. 1 illustrates an avionics system, designated generally as 10, in accordance with the principles of the present invention. A Push-To-Recognize (PTR) switch 12 interacts with an Informational Management System (IMS) (not shown) of the avionics system 10 to signal automatic speech recognition software to begin processing voice commands. The IMS may be, for example, an IMS-6000 manufactured by Rockwell Collins, Inc. In the preferred embodiment, the PTR switch 12 interacts with a discrete input on the IMS-6000 system, signaling to the ASR software 16 to begin processing voice commands. An Adaptive Flight Display (AFD) 14 is operatively connected to the PTR switch for accepting commands from the PTR switch 12 and displaying the results of radio tuning commands. The PTR switch 12 may be a button, toggle, or push to talk switch. The AFD 14 may be, for example, a flight display of the type manufactured by Rockwell Collins, Inc.—Adaptive Flight Display (AFD-6520). The AFD 14 accepts input from other systems to display the results of the radio tuning commands.

A voice recognition (VR) subsystem 16 is operatively connected to the AFD 14. The VR subsystem 16 includes automatic speech recognition software for processing the digital signal received from the IMS via the AFD 14. The VR subsystem 16 is configured to recognize an utterance of a unique word and to encode a specific frequency associated with the utterance of that word to a digital command string. When the unique word is "EMERGENCY" the VR subsystem 16 encodes this to a full command string of TUNE-RADIO NAME—121.5 mHZ, as shown by process block 18. If the operator is a pilot, upon initiation of the PTR switch, the frequency command string is TUNE-COMM 1—121.5 and in the case of copilot initiation of the PTR switch, the frequency command string is TUNE-COMM 2—121.5.

The VR subsystem 16 sends out ARINC data labels 20 to an ARINC Graphics Server (AGS) 22, and Network Data Objects (NDOs) 23 to a Radio Tuning System Application (RTSA) 24. The AGS may be, for example, application software partitioned within the AFD 14. The ARINC 661 Graphics server (AGS) renders the display based on ARINC 661 labels 20. The VR subsystem 16 processes the digital signal by dividing a command string of said digital signal into its individual components, comprising commands, frequencies and displays, each component being routed by way of an NDO 23 to an appropriate hardware device.

A Window Manager (WM) 26 operatively connected to the AFD 14 manages the placement of displays. The WM 26 may be, for example, application software partitioned within the AFD 14. The Window Manager manages the placement of displays within the AFD 14 via instructions provided by the RTSA widget application software 34.

The RTSA 24 operatively connected to the VR subsystem 16 renders and processes the radio tuning commands displayed by the WM 26. The RTSA 24 may be, for example, application software, partitioned within the AFD 14. This software renders and processes radio tuning commands in a display window. For radio tuning, the final result will be displayed in the preset window of the Control Tuning Panel (CTP) 30, requiring visual confirmation and swap to active by the pilot. If after initiation of the PTR switch 12, no voice commands have been received after five seconds of system timing 28, the window manager 26 will remove all graphics on the AFD 14 indicating that the VR system was activated and available to accept voice utterances.

A VR dialog box 32 will be drawn at the predefined display location on the AFD 14, as defined by the RTSA Widget 34, using the ARINC 661 protocol to display the detailed frequency being tuned within the RTSA 24 application.

VR subsystem 16 is typically referred to as Automatic Speech Recognition (ASR) software. In the preferred embodiment, this particular software processes the digital signal received from the IMS-6000, sending out ARINC 661 labels to the ARINC 661 Graphics Server (AGS) and Network Data Objects (NDOs) to the Radio Tuning System Application (RTSA), The VR subsystem 16 will recognize several command shortcuts, routing the NDOs 23 accordingly. For example, the pilot may execute a radio tuning command for the COM1 radio only by simply speaking the radio name and the frequency. Additional shortcuts allow for the emergency frequency of 121.5 by speaking the radio name and "Emergency," and a "ground" shortcut spoken as "Ground Point" [FREQUENCY]. The pilot may always utilize a full command string, including: TUNE—RADIO NAME—FREQUENCY.

With the PTR 12 depressed, VR 16 sends the tune command and radio name to the appropriate hardware. When the PTR button is released, the VR application will send the processed frequency, via NDO 23, to the appropriate hardware.

Other embodiments and configurations may be devised without departing from the spirit of the invention and the scope of the appended claims.

The invention claimed is:

1. An avionics system, comprising:
    a voice recognition (VR) system configured to recognize an utterance of unique specific words and to tune a specific radio to a specific frequency associated with said utterance;
    a Push-to-Recognize (PTR) switch operably connected to said VR system, to signal automatic speech recognition software of said VR system to begin processing voice commands, wherein said VR system comprises:
    a) an Adaptive Flight Display (AFD) operatively connected to said PTR switch for accepting commands from said PTR switch;
    b) a voice recognition (VR) subsystem operatively connected to said AFD comprising automatic speech recognition software for processing a digital signal received from said AFD, said VR subsystem for sending out data labels to a Graphics Server (GS), and Network Data Objects (NDOs) to a Radio Tuning System Application (RTSA);
    c) a Window Manager (WM) operatively connected to said AFD for managing the placement of displays;
    d) the Radio Tuning System Application (RTSA) operatively connected to said VR subsystem for rendering and processing said radio tuning commands displayed by said WM; and
    e) the Graphics Server (GS) for rendering said displays based on said data labels.

2. The avionics system of claim 1, wherein said unique word is "EMERGENCY" and said voice recognition system encodes this to a full command string of TUNE—RADIO NAME—121.5 mHZ.

3. The avionics system of claim 1, wherein said VR system is configured to recognize a unique word and to encode said specific frequency through the use of look up tables.

4. The avionics system of claim 2, said RADIO NAME for initiating a signal that an operator is issuing a voice command, wherein if said operator is a pilot, upon initiation of the PTR switch, the frequency command string is TUNE—COMM 1—121.5 and in the case of copilot initiation of the PTR switch, the frequency command string is TUNE—COMM 2—121.5.

5. The avionics system of claim 1, wherein
    said Push-To-Recognize (PTR) switch interacts with an Informational Management System (IMS) of the avionics system to signal automatic speech recognition software to begin processing voice commands.

6. The avionics system of claim 5, wherein said VR subsystem processes said digital signal by dividing a command string of said digital signal into its individual components, comprising commands, frequencies and displays, each component being routed by way of an NDO to an appropriate hardware device.

7. The avionics system of claim 5, wherein said ARINC Graphics Server comprises an ARINC 661 Graphics Server.

8. A method for recognizing a unique word in a speech recognition system of an avionics system for the purpose of encoding a specific frequency associated with that word, comprising the steps of:
   utilizing a voice recognition (VR) system for translating a voice command utterance of unique specific command words to tune a specific radio to a specific frequency associated with said utterance;
   utilizing a Push-to-Recognize (PTR) switch operably connected to said VR system, to signal automatic speech recognition software of said VR system to begin processing voice commands;
   utilizing an Adaptive Flight Display (AFD) operatively connected to said PTR switch for accepting commands from said PTR switch;
   utilizing a voice recognition (VR) subsystem operatively connected to said AFD comprising automatic speech recognition software for processing a digital signal received from said AFD, said VR subsystem for sending out data labels to a Graphics Server (GS), and Network Data Objects (NDOs) to a Radio Tuning System Application (RTSA);
   utilizing a Window Manager (WM) operatively connected to said AFD for managing the placement of displays;
   the Radio Tuning System Application (RTSA) operatively connected to said VR subsystem for rendering and processing said radio tuning commands displayed by said WM; and,
   the Graphics Server (GS) for rendering said displays based on said data labels.

9. The method of claim 8, wherein said step of translating a voice command utterance of a key command word to a specific frequency, comprises utilizing a said VR system configured to recognize said unique key command word and to encode said specific frequency through the use of look up tables.

10. The method of claim 9, wherein said unique word is "EMERGENCY" and said voice recognition system encodes this to a full command string of TUNE—RADIO NAME—121.5 mHZ.

11. The method of claim 8, further comprising the step of:
   a) utilizing said Push-To-Recognize (PTR) switch for interacting with an Informational Management System (IMS) of the avionics system to signal automatic speech recognition software to begin processing voice commands.

12. The method of claim 11, wherein said VR subsystem processes said digital signal by dividing a command string of said digital signal into its individual components, comprising commands, frequencies and displays, each component being routed by way of an NDO to an appropriate hardware device.

* * * * *